(12) United States Patent
Fenech et al.

(10) Patent No.: US 8,340,573 B2
(45) Date of Patent: Dec. 25, 2012

(54) PAYLOAD SYSTEM FOR SATELLITES

(75) Inventors: Hector Fenech, Issy les Moulineaux (FR); Emmanuel Lance, Clichy (FR)

(73) Assignee: Eutelsat S A, Paris (FR)

( * ) Notice: Subject to any disclaimer, the term of this patent is extended or adjusted under 35 U.S.C. 154(b) by 751 days.

(21) Appl. No.: 11/860,648

(22) Filed: Sep. 25, 2007

(65) Prior Publication Data

US 2008/0076350 A1 Mar. 27, 2008

(30) Foreign Application Priority Data

Sep. 26, 2006 (EP) .................... 06 291 514

(51) Int. Cl.
*H04B 7/185* (2006.01)

(52) U.S. Cl. .......... 455/12.1; 455/427; 455/303

(58) Field of Classification Search ........... 455/12.1, 455/25, 13.4, 127.1, 427; 370/324, 317, 370/350; 330/126, 124 R, 51, 149, 295
See application file for complete search history.

(56) References Cited

U.S. PATENT DOCUMENTS

| | | | |
|---|---|---|---|
| 3,917,998 A | 11/1975 | Welti | |
| 5,115,248 A | 5/1992 | Roederer | |
| 5,289,193 A | 2/1994 | Lenormand et al. | |
| 5,574,967 A * | 11/1996 | Dent et al. | 455/12.1 |
| 5,675,285 A * | 10/1997 | Winters | 330/124 R |
| 5,771,444 A * | 6/1998 | Dent et al. | 455/127.5 |
| 5,860,057 A * | 1/1999 | Ishida et al. | 455/12.1 |
| 6,014,056 A * | 1/2000 | Rivierre | 330/124 R |
| 6,438,354 B2 * | 8/2002 | Thompson et al. | 455/12.1 |
| 7,139,539 B2 * | 11/2006 | Chun | 455/127.1 |
| 2003/0095513 A1 * | 5/2003 | Woodmansee et al. | 370/324 |
| 2003/0134595 A1 * | 7/2003 | DiCamillo et al. | 455/13.4 |
| 2005/0227617 A1 | 10/2005 | Hoffmann et al. | |

* cited by examiner

*Primary Examiner* — Lana N Le
*Assistant Examiner* — Golam Sorowar
(74) *Attorney, Agent, or Firm* — Leydig, Voit & Mayer, Ltd.

(57) ABSTRACT

A payload system for satellites comprising transponder devices with an input section including an uplink antenna, a low noise amplifier, and a converter, and an output section including an input filter, a high power amplifier, an output filter, and a downlink antenna. At least some of the transponders share their high power amplifiers and the high power amplifiers shared have a maximum power smaller than the total power which can be transmitted by the payload.

1 Claim, 2 Drawing Sheets

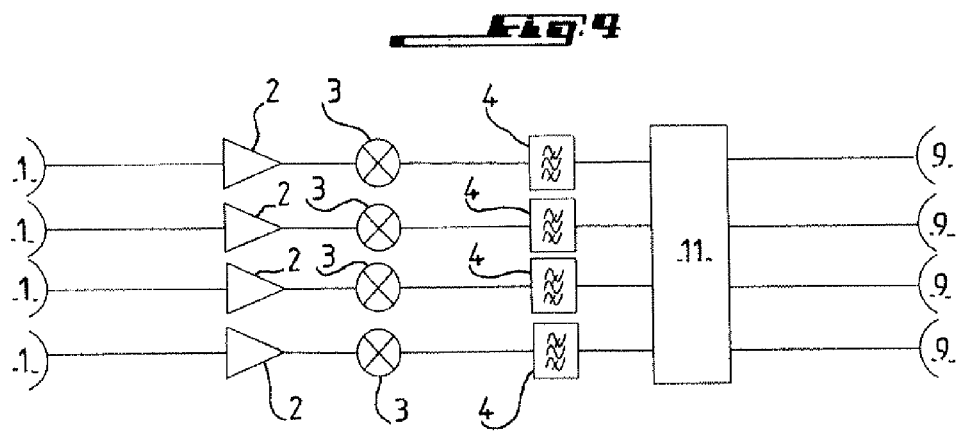
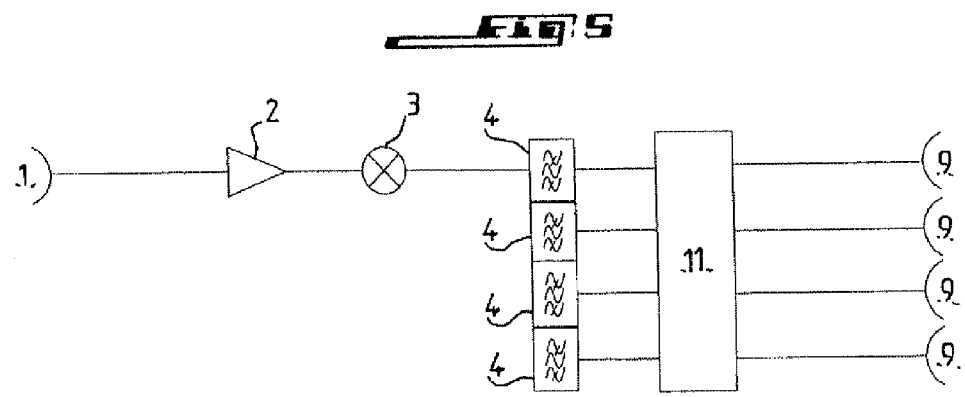
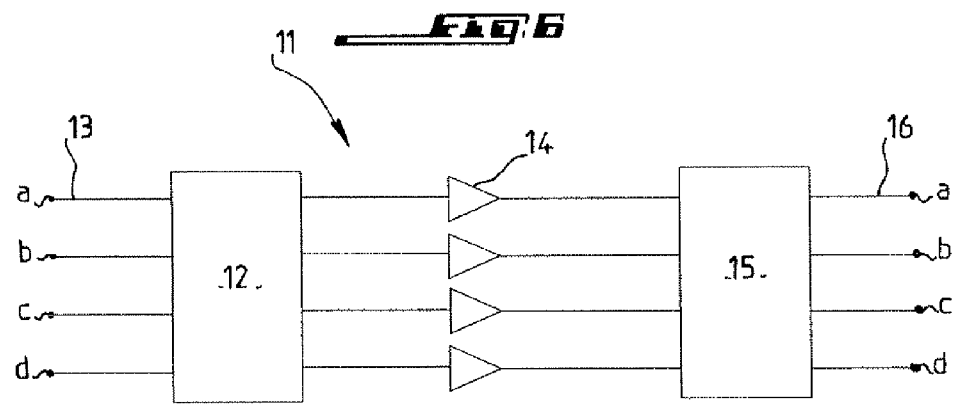

PAYLOAD SYSTEM FOR SATELLITES

FIELD OF THE INVENTION

The invention relates to a payload system for satellites comprising a plurality of transponder devices each comprising an input section including uplink antenna means, low noise amplifier means, converter means, and an output section including input filter means, high power amplifier means, output filter means and downlink antenna means.

BACKGROUND

It is known to associate each transponder to a high power amplifier of a given power. These known payload systems have the inconvenience that the power to be transmitted by each transponder can be reduced if less power is required but cannot be increased beyond the maximum power of the amplifier. This means that the high power amplifier is dimensioned for the maximum power envisaged. Power which is not used by the high power amplifier of a transponder cannot be allocated to another one which may require extra power. The capacity of each transponder is limited by the maximum power of its high power amplifier.

SUMMARY OF THE INVENTION

The object of the present invention is to eliminate this inconvenience.

For this purpose the proposed payload system is characterized in that at least a part of the transponders share their high power amplifier means and in that the high power amplifiers of each said part of transponders have a maximum power smaller than the total power which can be transmitted by the payload.

According to another feature of the invention the system is characterized in that said part of transponders comprise a multiport amplifier including an input matrix with an input for each of said part of transponders, a bank of high power amplifiers each for one of said part of transponders and an output matrix having an output port for each of said transponders.

According to still another feature of the invention, the system is characterized in that the input section of the system comprising the antenna means, the low noise amplifier means and the converter means is common to all transponders and in that the output section comprising the input filter means, the amplification chain means and the output filter means differs for the transponders and in that the high power amplifier means of these transponders are shared by the provision of a multiport amplifier.

According to still another feature of the invention, the system is characterized in that the input section and the output section differs for the different transponders and in that the high power amplifier means of the transponders are shared by the provision of a multiport amplifier.

BRIEF DESCRIPTION OF DRAWING FIGURES

Figure 1:
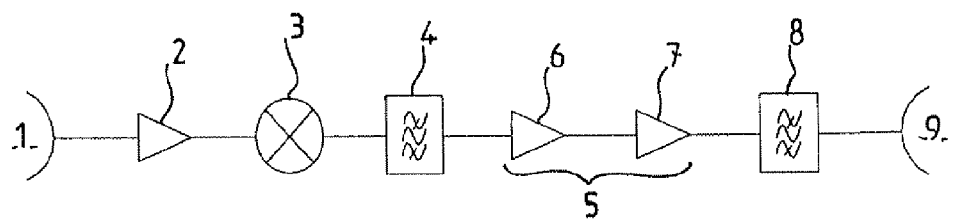
Figure 2:
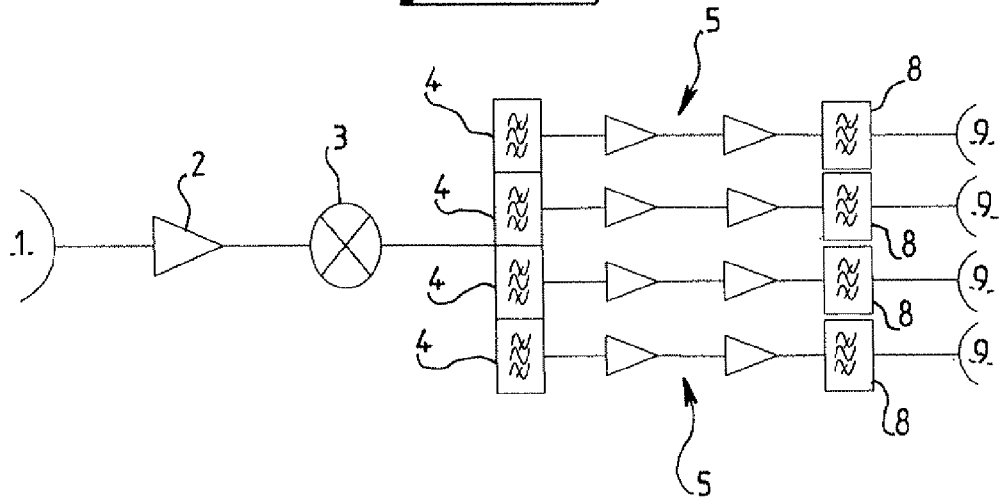
Figure 3:
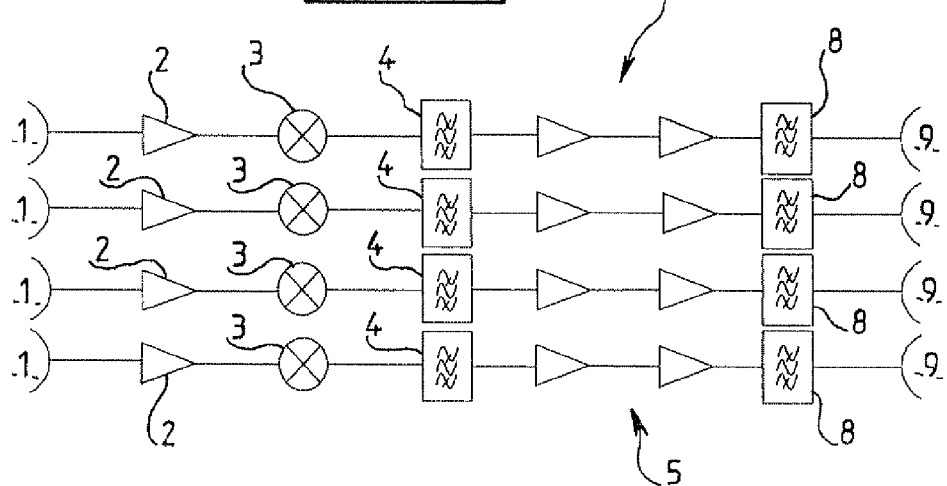

The invention will be described here-below in a more detailed manner with reference to figures showing an example of realizing the present invention. These figures show:

FIG. 1 the functional block diagram of a transponder of a payload system for a satellite;

FIGS. 2 and 3 two payload architectures to which the invention is applicable;

FIGS. 4 and 5 the structure of the payload architectures according respectively to FIGS. 2 and 3, after application of the invention;

FIG. 6 the diagram of a multiport amplifier (MPA) such as shown on FIGS. 4 and 5;

DETAILED DESCRIPTION

It is known that satellites include two subsystems, the platform and the payload. The platform supports the payload with the functions to constitute the structure including the deployment mechanisms for the antennas and solar arrays, the on board control system to ensure satellite autonomy, the electrical power system, the telecommand, telemetry and data handling system, the thermal control system and the attitude and orbital control system including the propulsion subsystem. The payload is dependent on the mission which in this case shall be that for a communication system to which it is associated. Typically a communications payload consists of a number of transponders the functional block diagram of which is given in FIG. 1.

In accordance to this figure, a transponder comprises an uplink antenna 1, a low noise amplifier (LNA) 2, a converter 3 an input filter or demultiplexer 4, an amplification chain 5 including a channel amplifier 6 and a high power amplifier (HPA) 7, an output filter or multiplexer 8 and a downlink antenna 9. Not all functions need be dedicated to a single transponder and certain functions can be shared by a number of transponders.

FIGS. 2 and 3 show payload architectures to which the invention is specifically applicable. In the case of the FIG. 2, the uplink antenna 1, the low noise amplifier 2 and the converter 3 are shared between four transponders. The input filter or demultiplexer 4 splits the input into the four transponder channels with bandwidth dedicated to each channel and each is processed by an amplification chain 5 which typically includes the channel amplifier 6 and the high power amplifier (HPA) 7. Each channel has its own output filter 8 and a downlink antenna 9. Accordingly, the uplink service area is common to all transponders, but the downlink service areas differ for the transponders.

In the payload architecture shown on FIG. 3 both the uplink service area and the downlink service area differ for the different transponders. It could also include a connectivity matrix to allow interconnections between the different coverages.

In satellite communications the high power amplifier (HPA) 7 represents an important resource that is heavy, dissipate a considerable amount of heat and consumes most of the DC power in the payload. It is consequently a dimensioning factor of the satellite. It is important to use these resources efficiently. This is the object of the present invention. Indeed, since the power of a transponder cannot be increased beyond the maximum power of the high power amplifier, the latter is to be dimensioned for the maximum (peak) power envisaged. Additionally power not used by the high power amplifier of a transponder cannot be allocated to another which may require extra power. The capacity of a transponder is accordingly limited by the maximum power of the high power amplifiers which implies that, in general, the total power of the HPAs, as a whole, is underutilised.

The object of the invention is to eliminate this disadvantage in order to enable the transmission of power greater than the maximum power of a transponder high power amplifier and to fully utilise the on board resources.

The FIGS. 4 and 5 show the payload architectures proposed for this purpose particularly suitable for the architectures depicted on figures respectively 2 and 3.

For realising this object, the payload comprises a multiport amplifier (MPA) 11 such as the own known as Butler amplifier. Such a multiport amplifier 11 comprises, as shown on FIG. 6, an input Butler matrix 12 which comprises in accordance to the example of the payload structures on FIGS. 4 and 5 four inputs 13a, b, c, d, a bank of four high power amplifiers 14 and an output Butler matrix 15 with four outputs 16a, b, c, d. For implementation reasons, the number of high power amplifiers 14 employed is $2^n$, while n is an integer typically 2, 3 or even 4. This is shown in FIG. 6 for n=2.

The principle of the multiport amplifier 11 is that a signal at an input port for instance 13a will be split in the input Butler Matrix 12 in amplitude with the appropriate phasing such that all amplifiers 14 will amplify an equal part of the signal. The signals from all of the high power amplifiers 14 are then combined by the output Butler Matrix 15 such that the vectorial addition of the signals produce an output at for instance port 16a and ideally nothing at the ports 16b, c, d. Similarly an input at input port 13b produces an output only at port 16b, an input signal at input port 13c, an output only at output port 16c and an input signal at input port 13d, an output only at output port 16d. The total radio frequency (RF) (power of the multiport amplifier is determined by the total RF power available for all the high power amplifiers 14).

Accordingly, the Butler input Matrix 12 represents a passive network which processes the signal entering one of the input ports 13 and simultaneously produces on each of its output ports a signal with equal power and a specific phase distribution.

It results from the foregoing that the different high power amplifiers 7 on FIGS. 2 and 3 are replaced by a multiport amplifier 11 on FIGS. 4 and 5. Instead of each transponder being associated to one high power amplifier, in the shown example of a payload system, a number of four transponders is associated to four shared high power amplifiers in a multiport amplifier. The maximum power in the multiport amplifier is fixed but since this is now associated to four transponders, there is a pooling effect. Power can be assigned to each transponder according to the needs and the power not used by some transponder can be assigned to others as long as the total shared power does not exceed the rating of the multiport amplifier.

The use of the multiport amplifier offers an efficient way to manage the resources of the payload according to the operational requirements. The high power amplifier is not dimensioned for the worst case power required but for the total requirement of a number of transponders. This gives an operational flexibility normally not available where the dimensioning is performed on the maximum requirement on a per transponder basis with the associated inefficiency rather than on the total power average over the number of transponders employing the multiport amplifier.

Concerning the channel amplifier 6, it is placed in these configurations at the multiport amplifier input. Thus the channel amplifier can be used to control the drive to the specific multiport amplifier input rather than the specific high power amplifier. Changing the power requirement for a given signal can thus be achieved either by reducing the power from the earth station uplinking the signal or by reducing the gain of the appropriate channel amplifier by telecommand. For simplicity, the channel amplifiers are not shown in FIG. 5.

The invention such as disclosed here above can be applied to a broadcasting system wherein the satellite is broadcasting over a number of countries. The architecture of such a broadcasting system is the one shown on FIG. 5 with the downlinks each covering a different country for instance Germany, Spain, France, Italy, Poland and the United Kingdom.

The communication system according to the invention has important advantages. Full connectivity and selectivity are possible sharing the power amongst the transponders on a service area or service areas with no impact on the output network. The output selectivity network is completely unnecessary in this architecture yet the selectivity is enhanced. According to FIG. 5, one transponder is provided per service area but this need not be the case. This is an extremely powerful operational feature which is otherwise too complicated to implement with an associated strong mass and cost impact. Since the multiport amplifier architecture avoids the use of an output multiplexer (OMUX), the output flexibility is further enhanced since there are no specificities related to the frequency plan. This opens opportunities that are normally not yet possible with a conventional payload. Any number of transponders of the given set can be activated with the full multiport amplifier power allocation with no impact on the output network. The available power can be efficiently divided amongst transponders. This is an extremely powerful operational feature that is otherwise too complicated if not impossible to implement with an associated strong mass and expensive. The output losses remain minimal despite the operational flexibility ensuring that as much as possible of the multipower amplifier power is usefully employed. This is important in terms of the performance and the associated financial upside. Since countries have different areas, the antenna gain associated with the service areas is different. Using the multiport amplifier concept allows compensation such that the performance on each employed service area is set to be equal if required or individually set to the required level. If equal performance is required, the multiport amplifier allows the increase of performance of the weakest service area which would otherwise be impossible to achieve. This enables the system design to be more optimised and be used operationally in a more optimised way. The multiport amplifier also enhances reliability since the power available could exceed that required tolerating high power amplifier failure without interruption of service. This is an interesting operational and commercial feature that is not normally possible with a conventional payload.

The Communication System according to the invention is furthermore advantageously applicable to a Broadband System with a large multi-spot service area.

In this application which corresponds to FIGS. 3 and 4, the total RF power for spot sharing the multiport amplifier is defined and can be shared in orbit among the corresponding spots. This concept provides operational flexibility such that the given power can be split between the spots of the associated multiport amplifier to cater for the operational variation of the capacity requirement. The multiport amplifier is used to provide capacity where and when required. If one spot requires more capacity than another spot or other spots are used below average capacity, then capacity can be diverted to the spot requiring the extra capacity.

Of course, all the advantages listed above are also applicable in this application, but there are some specific advantages in this scheme as listed hereafter:

Using a multi-spot coverage, it is impossible to predict where the capacity will be required on a per spot basis even on an average basis. The multiport amplifier (MPA) concept allows the design for the average case. The alternative would be to design for the maximum power requirement which in general would lead to an over-dimensioned system with the associated cost impact.

Additionally, there are diurnal variations, seasonal variations, variations over time zones and longer term variations over the satellite lifetime (typically 15 years). The implied pooling of resources of an multiport amplifier represents a better utilisation of the satellite resources enhancing the utilisation and profitability of the system by eliminating segmentation of resources. The system can be dimensioned for the maximum required capacity for a set of spot over time and not for the maximum possible capacity on a per spot basis representing a better utilisation of the spacecraft resources.

The allocation of power to a spot can exceed that of a single high power amplifier which in a conventional payload is not possible. This enhances the operability of the system since it introduces the possibility to operate regionally with peak that exceeds the high power amplifier capacity.

It results from the foregoing that in a system according to the invention, the power allocation for a transponder can exceed the power available from the equivalent power amplifier in a multiport amplifier, if and when necessary. This is not possible in a classical payload. The flexibility to allocate the full resources between a number of transponders in orbit is a relatively easy feature to accomplish with a multiport amplifier which, in general, is too complicated to implement with a conventional payload. Moreover, the multiport amplifier concept has the advantages that it eases the design of the satellite considerably, that it eases the business case in the planning stations because of the operational flexibility and larger range of operational scenarios that the system can cater for, and that it enhances the operational flexibility in orbit during the satellite life time due to changes of the market and commercial developments that could be impossible to foresee before the satellite definition phase.

The invention claimed is:

1. A multichannel payload system for satellites, the payload system comprising:
   a plurality of input sections, each input section including
      an uplink antenna receiving an uplink signal from a respective uplink service,
      a low noise amplifier amplifying the uplink signal received at the uplink antenna,
      a converter converting the uplink signal amplified by the low noise amplifier, and
      an input filter filtering the signal converted by the converter;
   a plurality of output sections, each output section including
      a respective downlink antenna outputting a signal from the payload system to a respective downlink service area; and
   a multiport amplifier connecting each respective input section to a corresponding one of the output sections so that uplink signals received at respective input sections are amplified and output at respective output sections, the multiport amplifier including
      an input Butler matrix having a plurality of input ports and output ports, wherein
         each input port of the input Butler matrix is connected to a corresponding one of the input sections for receiving a respective signal amplified by the low noise amplifier, converted by the converter, and filtered by the filter of the corresponding input section,
         the input Butler matrix splits, in amplitude, each signal input to each input port of the input Butler matrix into respective parts, and
         each respective part is output at a corresponding output port of the input Butler matrix as a signal to be amplified,
      a plurality of high power amplifiers, each high power amplifier having an input terminal and output terminal, receiving at the input terminal a respective one of the signals to be amplified from a corresponding one of the output ports of the input Butler matrix, amplifying the signal to be amplified that is received, and outputting a signal amplified by the respective high power amplifier to the output terminal of the respective high power amplifier, and
      an output Butler matrix having a plurality of input ports and output ports, wherein
         each input port of the output Butler matrix is connected to a corresponding output terminal of a respective one of the high power amplifiers,
         the output Butler matrix combines the signals received at the input ports of the output Butler matrix so that each of the amplified signals output at each of the output ports of the output Butler matrix corresponds to a respective one of the signals to be amplified that are input to the input ports of the input Butler matrix, and
         the output ports of the output Butler matrix are connected to respective output sections of the payload system, whereby at least one of the signals received at one of the uplink antennas can be output from a corresponding downlink antenna at a higher power than can be produced by any individual one of the high power amplifiers.

* * * * *